US008050711B2

(12) United States Patent     (10) Patent No.:    US 8,050,711 B2
Wang et al.                                   (45) Date of Patent:     *Nov. 1, 2011

(54) METHODS, SYSTEMS AND APPARATUS FOR DISPLAYING THE MULTIMEDIA INFORMATION FROM WIRELESS COMMUNICATION NETWORKS

(75) Inventors: Teijun Wang, La Jolla, CA (US); William E. Halal, Washington, DC (US); Tiehong Ann Wang, Arlington, VA (US); Ximing Wang, Beijing (CN)

(73) Assignee: SellerBid, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/929,408

(22) Filed: Jan. 21, 2011

(65) Prior Publication Data

US 2011/0149148 A1     Jun. 23, 2011

Related U.S. Application Data

(63) Continuation of application No. 11/165,341, filed on Jun. 24, 2005, now Pat. No. 7,899,492.

(60) Provisional application No. 60/588,358, filed on Jul. 16, 2004.

(51) Int. Cl.
*H04M 1/00* (2006.01)
*H04B 1/38* (2006.01)
(52) U.S. Cl. ..................................... 455/556.1; 455/566
(58) Field of Classification Search .................. 455/500, 455/3.06, 414.4, 566, 557, 556.1, 66.1, 414.1, 455/418–420; 375/240.01, 240.02, 240.18; 348/14.07, 14.12, 14.13, 384.1, 441
See application file for complete search history.

(56) References Cited

U.S. PATENT DOCUMENTS

| 4,740,963 | A | | 4/1988 | Eckley |
| 5,610,971 | A | | 3/1997 | Vandivier |
| 5,880,732 | A | * | 3/1999 | Tryding ........................ 715/810 |
| 6,128,509 | A | * | 10/2000 | Veijola et al. .............. 455/556.1 |
| 6,181,954 | B1 | | 1/2001 | Monroe et al. |
| 6,275,333 | B1 | | 8/2001 | Shaffer |
| 6,404,763 | B1 | | 6/2002 | Renucci et al. |
| 6,546,263 | B1 | | 4/2003 | Petty et al. |
| 6,690,417 | B1 | | 2/2004 | Yoshida et al. |

(Continued)

FOREIGN PATENT DOCUMENTS

EA          1429511        6/2004

OTHER PUBLICATIONS

Notification of Transmittal of the International Search Report and the Written Opinion of the Internationla Searching Authority, or the Declaration; International Application No. PCT/US05/25284; Filing Date: Jul. 15, 2005.

*Primary Examiner* — George Eng
*Assistant Examiner* — Brandon Miller
(74) *Attorney, Agent, or Firm* — Rader, Fishman & Grauer PLLC

(57) ABSTRACT

Video signals for a mobile terminal are converted to accommodate reproduction by an alternative display terminal. The video signal is processed to provide a converted video signal appropriate for an alternative display terminal that is separate from the mobile terminal. This converted video signal is then provided for the alternative display terminal to accommodate the corresponding video display on a screen provided by the alternative (e.g., external) display terminal.

21 Claims, 7 Drawing Sheets

U.S. PATENT DOCUMENTS

| | | |
|---|---|---|
| 6,718,182 B1 | 4/2004 | Kung |
| 6,781,635 B1 * | 8/2004 | Takeda .......................... 348/552 |
| 6,859,358 B2 | 2/2005 | Baldwin et al. |
| 6,873,853 B2 * | 3/2005 | Kim .............................. 455/466 |
| 6,907,276 B2 | 6/2005 | Toba |
| 6,970,127 B2 * | 11/2005 | Rakib .......................... 341/173 |
| 7,248,888 B2 * | 7/2007 | Inselberg ...................... 455/517 |
| 7,257,202 B2 * | 8/2007 | Umemura et al. .......... 379/88.14 |
| 7,312,813 B1 * | 12/2007 | Heinonen .................... 348/158 |
| 7,360,085 B2 * | 4/2008 | Loveria, III .................. 713/165 |
| 7,899,492 B2 * | 3/2011 | Wang et al. ................ 455/556.1 |
| 2002/0090980 A1 * | 7/2002 | Wilcox et al. ................ 455/566 |
| 2002/0094826 A1 | 7/2002 | Lee |
| 2002/0102998 A1 * | 8/2002 | Lin .............................. 455/466 |
| 2002/0137505 A1 | 9/2002 | Eiche et al. |
| 2002/0137551 A1 | 9/2002 | Toba |
| 2003/0054794 A1 | 3/2003 | Zhang |
| 2003/0104806 A1 * | 6/2003 | Ruef et al. .................... 455/422 |
| 2003/0130009 A1 * | 7/2003 | Kung ............................ 455/557 |
| 2004/0046783 A1 | 3/2004 | Montebovi |
| 2004/0056985 A1 | 3/2004 | Scong |
| 2004/0125136 A1 | 7/2004 | Wallenius |
| 2004/0157642 A1 | 8/2004 | Lee et al. |
| 2004/0177376 A1 * | 9/2004 | Caspi et al. .................... 725/81 |
| 2004/0212731 A1 * | 10/2004 | Sie et al. ........................ 348/445 |
| 2005/0036509 A1 * | 2/2005 | Acharya et al. ............... 370/466 |
| 2005/0085183 A1 * | 4/2005 | Lee .............................. 455/3.01 |
| 2005/0088463 A1 | 4/2005 | Schilling |
| 2005/0144461 A1 * | 6/2005 | Takamatsuya ................ 713/182 |
| 2005/0144641 A1 | 6/2005 | Lewis |
| 2006/0001737 A1 * | 1/2006 | Dawson et al. ............ 348/14.08 |
| 2007/0287498 A1 * | 12/2007 | Wang et al. ................ 455/556.1 |

* cited by examiner

METHODS, SYSTEMS AND APPARATUS FOR DISPLAYING THE MULTIMEDIA INFORMATION FROM WIRELESS COMMUNICATION NETWORKS

CROSS REFERENCE TO RELATED APPLICATIONS

This application is a continuation of U.S. application Ser. No. 11/165,341, filed on Jun. 24, 2005 and entitled "Mobile Terminal Signal Conversion for External Display," which claims the benefit of provisional application Ser. No. 60/588,358, filed on Jul. 16, 2004 and entitled "A Method and System for Displaying the Multimedia Information from Wireless Communications or Portable IT Devices." The entire contents of these applications are hereby incorporated by reference.

BACKGROUND OF THE INVENTION

1. Field of the Invention

This invention relates generally to mobile terminals and related technology and more particularly to mobile terminal signal conversion for external display.

2. Description of the Related Art

Handheld mobile terminals (e.g., cellular phones, personal digital assistants (PDA)) continue to evolve both in terms of execution platform and functionality. It is believed that the much of the functionality provided by a personal computer (e.g., desktop or laptop) will ultimately become virtually available in handheld mobile terminals, which will allow users to work with and access multimedia information any time and anywhere.

For example, one particularly appealing advantage of the next generation wireless communication system and beyond (i.e., 3G, 4G, etc.) is the capacity to support high rate multimedia data services as well as conventional voice services. In a conventional cellular system a mobile terminal communicates with a base station wirelessly. Multimedia information including but not limited to television, 3D images, network games, and video phone calls is transmitted from various service providers and received for display on the screen of a mobile terminal. The net result of such a system is rich multimedia information being destined for display on the small screens typical of cellular phones (or the like).

In these and similar systems, the mobile terminal functions as a multimedia terminal to display multimedia information (including high-resolution graphics and high-quality real-time audio/video) sent from high data rate wireless communications network. The limited size (e.g., 2×3") and capability of the mobile terminal screen may render enjoyment of the high rate data flow applications inconvenient, and in some instances useless. One consequence of this inadequacy is likely shrinkage of the potential market size for handheld mobile terminals. Indeed, some have suggested that development of high data rate systems such as 3G systems may be pointless given the limitations imposed by the small screen.

Some mobile units appear to provide a remote control function to an external display system. However, these do not appear to solve the small screen problem outlined above. That is, they do not accommodate display on a larger, external display of video and other multimedia information originally destined for the mobile terminal display screen.

For example, one such interface accommodates usage of the mobile terminal as a remote control for a television, by feeding programming guide information to the mobile terminal. This is useful for allowing the programming guide to be viewed locally while the larger screen displays a current program, but does not address to the above-described small screen problem.

Although mobile terminals have been developed to include enhanced signal processing and related capabilities, user enjoyment is diminished by the limitations of the display provided with such mobile terminals. What is needed is a solution to the problem of diminished user enjoyment of mobile terminals because of display limitations.

SUMMARY OF THE INVENTION

In accordance with the present invention, the multimedia signal destined for the mobile terminal is converted and provided to an external display system, so that the corresponding video and/or audio may be reproduced using the external system.

It is believed that this feature will be useful in various environments, including but not limited to transportation environments such as planes, trains and automobiles; hotels; waiting areas; and any location where high data rate services can be more fully supported by external display terminals.

According to one aspect, processing signals for reproduction by an external display terminal includes receiving a video signal that accommodates a video display on a first screen provided by the mobile terminal. The video signal is then processed to provide a converted video signal appropriate for an external display terminal that is separate from the mobile terminal. This converted video signal is then provided for the external display terminal to accommodate the corresponding video display on a screen provided by the external display terminal.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
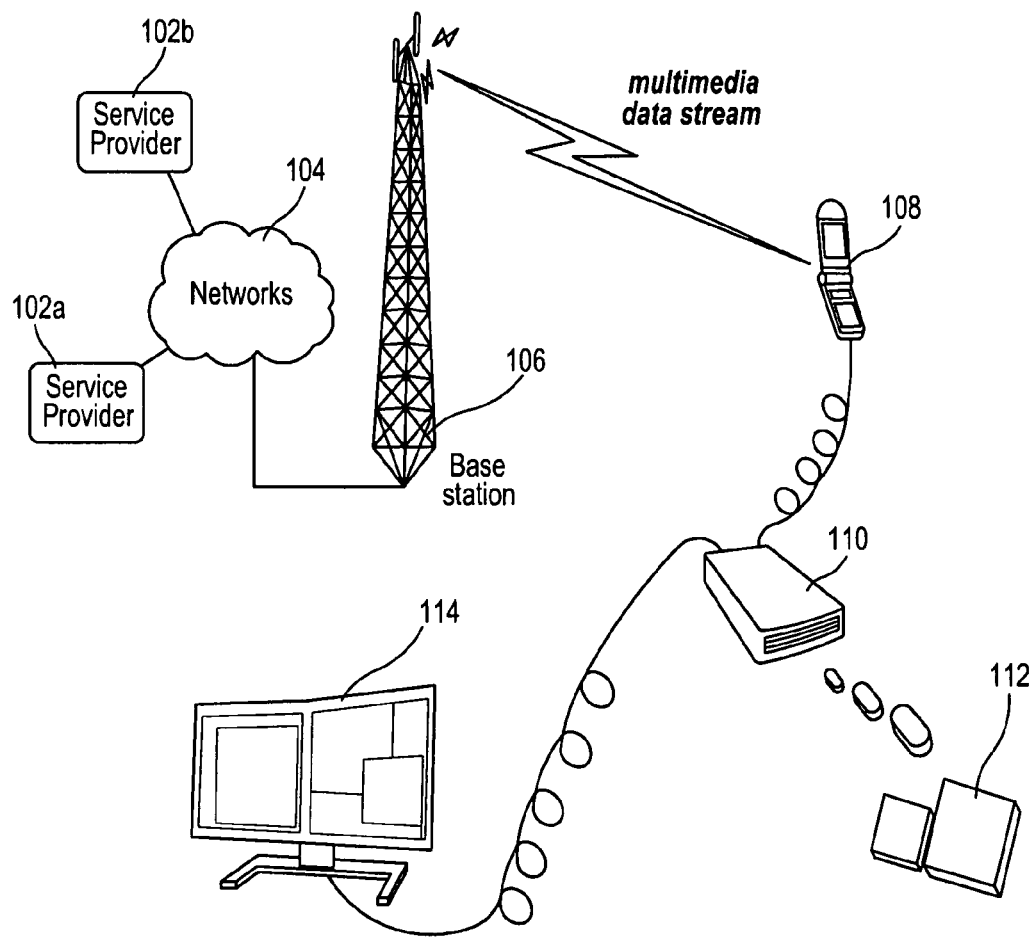
FIG. 1 is a schematic diagram illustrating an example of a system in which mobile terminal signal conversion may reside in accordance with the present invention.

FIG. 1 is a schematic diagram illustrating an example of a system 100 in which mobile terminal signal conversion may reside in accordance with the present invention.

Mobile terminal signal conversion accommodates displaying the high rate data flow multimedia information available in a wireless communication environment in an external device. This accommodates true realization and enjoyment of the benefits of the multimedia content.

In one example, the multimedia information is provided to a wireless mobile terminal using so-called next generation cellular technology (i.e., 3G and 4G), which can be employed in transmitting multimedia information (e.g., rich graphics, real-time audio/video). Because of the relatively small screen size and low quality ear phones, for many applications the mobile terminal cannot adequately reproduce the high quality multimedia information that can be communicated using next generation technology with adequate clarity and satisfaction. Mobile terminal signal conversion in accordance with this embodiment of the present invention makes usage of a separate multimedia display terminal including but not limited to a monitor, television set, projector, or LCD display. These displays typically have video and audio reproduction capabilities that are superior to those found on mobile terminals. They also use a power supply that is separate from the mobile terminal.

Still referring to the system 100 illustrated in FIG. 1, multimedia information may be provided by any number of service providers 102a-b and delivered through a network 104 to a base station 106 to ultimately accommodate transmission of the multimedia information, among other things, to a cellular phone 108. This system 100 is provided by way of example, and it should be understood that any conventional or to-be-developed technology for delivering voice and/or data to mobile terminals may be provided. These wireless communication networks include but are not limited to a cellular communications network or a wireless local area network.

Also illustrated is a typical external display system 114. This may also be variously provided and may be digital or analog. Examples of digital systems include HDTV, LCD and plasma. Examples of analog systems include television sets that implement standards such as NTSC, PAL, SECAM, and analog computer monitors (SVGA, VGA). The external display system 114 does not have the size constraints of the display screen on the cellular phone 108 and is preferably powered independently.

In the illustrated embodiment, a mobile terminal signal conversion module (MTSCM) 112 resides within a separate housing 110, outside the cellular phone 108.

Figure 4:
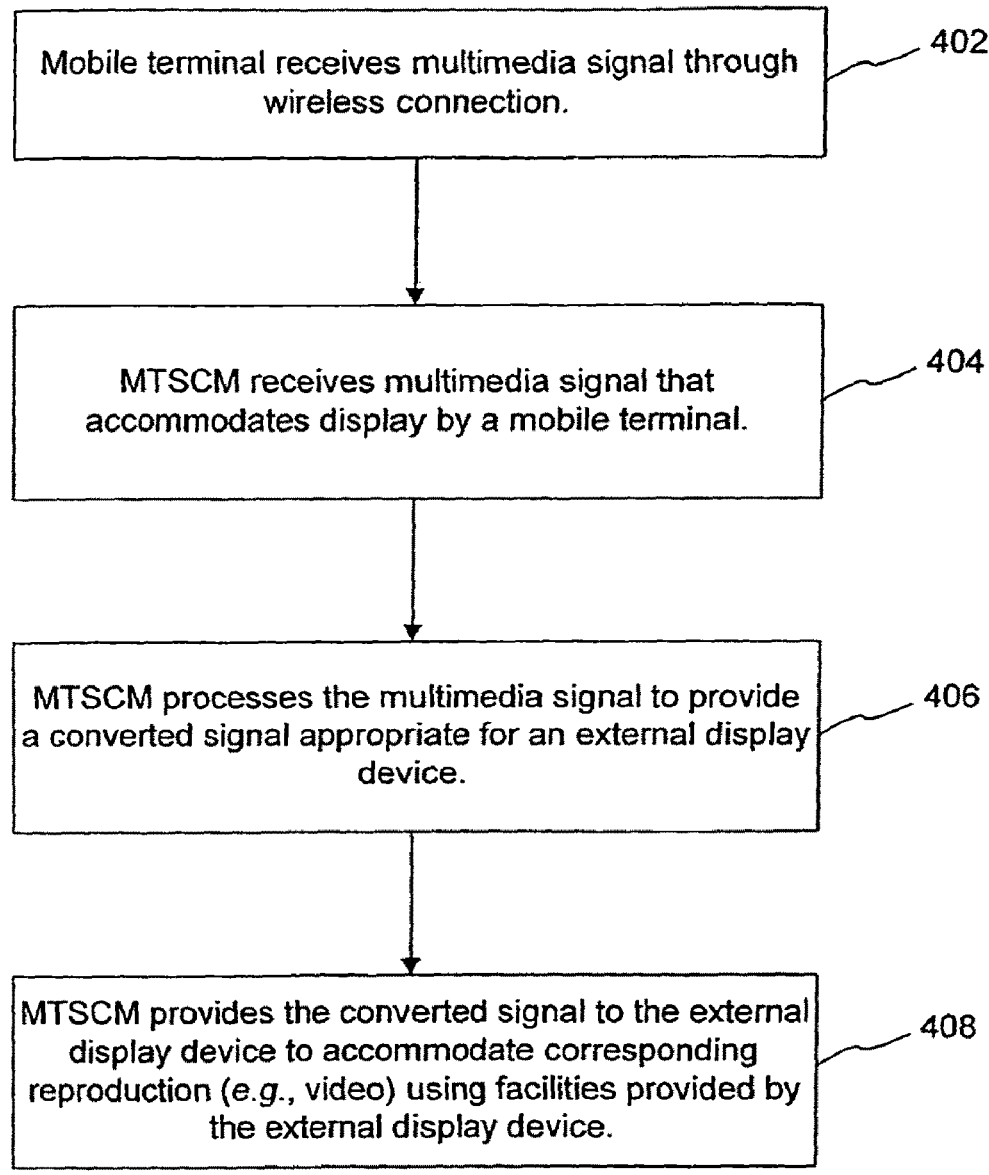
FIG. 4 is a flow diagram illustrating an embodiment of a process including mobile terminal signal conversion in accordance with the present invention.

The functionality of the MTSCM 112 is now further described with concurrent reference to FIG. 1 and the flow diagram of FIG. 4.

The MTSCM 112 processes signals to accommodate reproduction by an external device. Specifically, a multimedia signal is transmitted to the cellular phone 108 through the wireless communications network as previously described (step 402). The multimedia signal may include a video signal intended for reproduction by the cellular phone 108, using the cellular phone display screen. For ease of description, processing of a video signal is described, although it should be understood that any multimedia signal or component thereof may be converted in accordance with the present invention.

The cellular phone 108 is connected to the MTSCM 110. This may be accommodated by a cable connection that interfaces the cellular phone 108 to the MTSCM 112 housing 110. Through this connection, the MTSCM 112 receives the video signal from the cellular phone 108 (step 404). The video signal as received may be configured to accommodate a video display on the screen provided by the cellular phone 108. The cable connection is an example of a wired connection interfacing the cellular phone 108 to the MTSCM 112. An alternative wired connection is a seat that directly interfaces the two without a cable. A wireless connection may also be provided, although it may currently be less practical to provide than the wired connection because of the potential for high throughput rate requirements. The wireless connection may also implement any conventional known technology including but not limited to a Bluetooth connection.

The MTSCM 112 processes the video signal to provide a converted video signal that has a display format and/or signal power level appropriate for an external display terminal 114 that is separate from the cellular phone 108 (step 406). The display format and/or signal power level of the external display terminal 114 may be different from that of the cellular phone 108 but there may also be embodiments where the format is the same. Even if the formats are the same, conversion of the signals to accommodate display on the external display terminal 114 would still be implemented to adjust the power level for driving the external display, and possibly to minimize throughput requirements. This signal conversion is described further with reference to FIGS. 2 and 3, below.

Still referring to FIGS. 1 and 4, following signal conversion, the MTSCM 112 provides the converted video signal to the external display terminal 114 to accommodate the corresponding video display on a screen provided by the external display terminal 114 (step 408). This may be accommodated through a connection between the MTSCM 112 housing 110 and the external display terminal 114 as shown.

As used herein, mobile terminal refers to typically handheld mobile devices such as cellular phones and personal digital assistants. Although these devices include an execution platform as well as input and display capabilities, such devices are distinguished from personal computers, such as desktop or laptop computers, which are not designed for convenient handheld usage.

Figure 2:
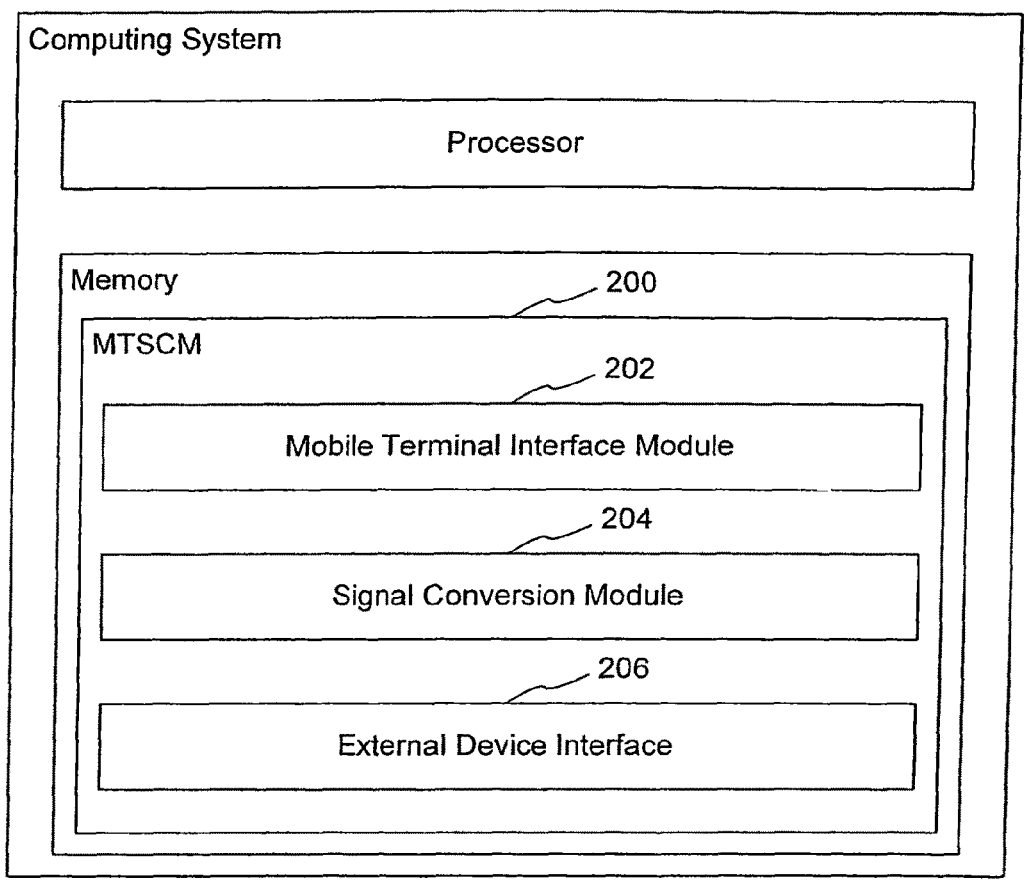
FIG. 2 is a block diagram illustrating an example of a mobile terminal signal conversion module in accordance with the present invention.

FIG. 2 is a block diagram illustrating an example of an MTSCM 200 in accordance with the present invention. The MTSCM 200 may be provided as software, firmware, hardware, or any combination thereof.

Where the MTSCM 200 is provided as software, it operates in the context of an execution platform. That is, the MTSCM 200 includes instructions that are stored in memory for execution by a processor. Any conventional or to-be-developed execution platform may be used. The processor, memory, and related elements such as a power supply are well known and need not be described herein to convey an understanding of the invention. Additionally, FIG. 2 illustrates one modular breakdown for the components of the MTSCM 200. It should be understood that the described functionality may alternatively be provided by an MTSCM having fewer, greater, or differently named modules from those illustrated in the figure.

Additionally, although modules as shown to reside in a common location, it is noted that the functionality may reside in separate components of a system that includes a mobile terminal, an external monitor, and (optionally) an intermediate device housing the MTSCM and interfacing the mobile terminal and external monitor. In other words, the overall functionality of the MTSCM may be separated such that portions of the overall functionality are respectively provided by the mobile terminal, separate intermediate housing, and/or the external display device.

The MTSCM 200 may also be provided in the form of a chipset, configured for inclusion in a mobile terminal, dedicated separate signal conversion device, or external display terminal, and to provide the described mobile terminal signal conversion functionality.

The MTSCM 200 includes a mobile terminal interface module 202, a signal conversion module 204, and an external device interface module 206.

The mobile terminal interface module 202 accommodates receiving the multimedia signal from the mobile terminal. A conventional physical interface provides a connection between the MTSCM 200 and the mobile terminal through which the signals flow to the MTSCM 200. The mobile terminal interface module 202 recognizes the multimedia signal and stores the signal for processing by the remaining modules. Buffering and the like may be implemented to accommodate storage and signal processing, as described further below.

The signal conversion module 204 is in communication with the mobile terminal interface module 202 and thus accesses the received multimedia signal. The signal conversion module 204 recognizes the multimedia signal format, and processes the multimedia signal to provide a converted signal. The converted signal may have a format and a signal power level that differs from the one used by the mobile terminal, as appropriate for one or more types of external devices to which the MTSCM 200 is connected. Various examples of the type of devices to which the MTSCM 200 may be connected are illustrated and described in connection with FIG. 3, below.

The external device interface 206 is in communication with the signal conversion module 204 and thus accesses the converted signal. The external device interface 206 also allows connection to the external (e.g., display) device. The external device interface 206 may provide both the feeding of the converted signal to the external device, and driving the external device. Alternatively, the external device interface 206 may merely feed the converted signal to the external device, with the external device including internal elements for driving its signal reproduction (e.g., display) facilities.

Figure 3:
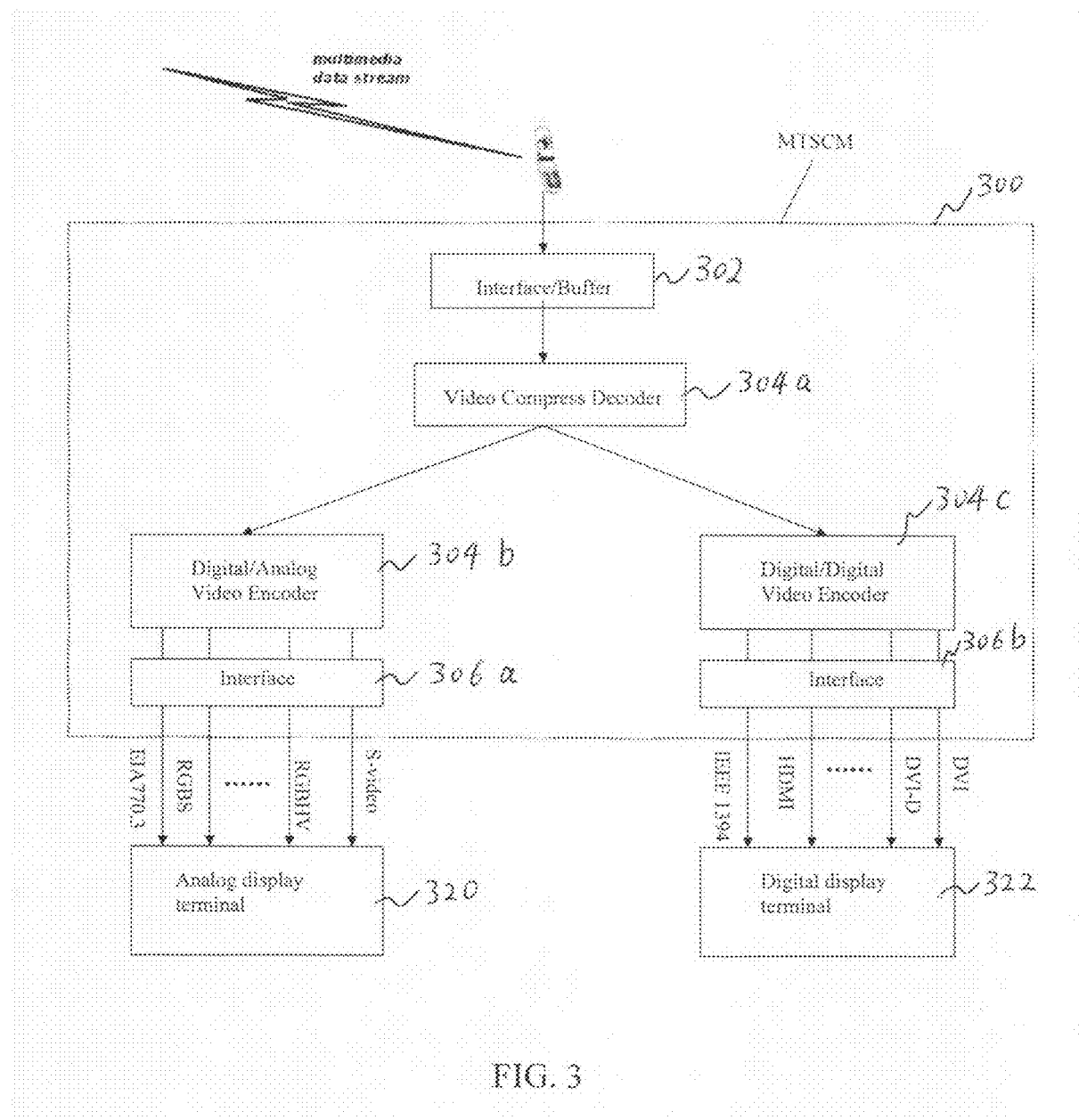
FIG. 3 is a block diagram illustrating another example of a mobile terminal signal conversion module in accordance with the present invention.

FIG. 3 is a block diagram illustrating another example of the MTSCM 300. The MTSCM 300 includes additional detail regarding the signal conversion aspect, and illustrates examples of differing types of external devices to which the MTSCM 300 may provide converted signals. The illustration and corresponding description are provided by way of example. Although numerous connections are illustrated, it should be understood that the present invention may be practiced in the context of providing as few as one, and as many as all of the listed connections. It should also be understood that there may be additional examples that are not listed herein, but which are encompassed by the teachings described herein.

The MTSCM 300 includes an interface/buffer module 302 that is analogous to the previously described mobile terminal interface module. The buffer and interfacing are configured to accommodate signal processing by the remaining elements in support of the requirements and expectations of users of the multimedia signal output (e.g., adequate buffering and processing rate to provide real time audio/video). The mobile terminal video compression format may of course vary, but currently the most likely format is MPEG-1 or MPEG-2. Buffering and throughput rate may also be provided as desired by the designer. Currently, it is believed that 200 Mb is an adequate buffer size, although buffers of 500 Mb or more may of course be provided. Additionally, a throughput rate of approximately 10 Gb/s will be adequate for many current systems, but may be increased as demands and technology evolve.

The Video Compress Decoder 304*a* receives the multimedia signal. The multimedia signal is typically provided in a compressed format to accommodate increased signal transfer rates. An example of a compression scheme is that provided by one of the MPEG standards (e.g., MPEG-1, MPEG-2, MPEG-4). The Video Compress Decoder 304*a* is configured to include the appropriate compression/decompression (CODEC) module to accommodate decompression of the received multimedia signal. For example, where the compression scheme is MPEG, the Video Compress Decoder 304*a* includes an MPEG CODEC to accommodate processing of such multimedia signals.

As an alternative to provision of the Video Compress Decoder 304*a* in the MTSCM 300, the functionality may be provided within the cellular phone or other mobile terminal. However, this may be less practical because of the high bandwidth that would be required between the cellular phone and the MTSCM 300 to deliver the decompressed signal, and the corresponding likelihood of a larger buffer requirement for the MTSCM 300.

The Video Compress Decoder 304*a* outputs a decompressed digital multimedia signal that is passed to the Digital/Analog Video Encoder (DAVE) 304*b* and/or the Digital/Digital Video Encoder (DDVE) 304*c*. The DAVE 304*b* is configured to prepare signals for analog external display terminals 320, and the DDVE 304*c* is configured to prepare signals for digital external display terminals 322. The DAVE 304*b* and DDVE 304*c* respectively receive the decompressed multimedia signal and convert the signals to the format(s) and signal power level(s) required for the terminals to which they interface.

Examples of formats used by analog display terminals 320 include S-video, RGBHV, RGBS, and EIA770.3 as illustrated. Similarly, the DDVE 304*c* provides output using standards such as DVI, DVI-D, HDMI, and IEEE1394. The signals respectively provided by the DAVE 304*b* and DDVE 304*c* are provided to the terminals through conventional interfaces 306*a-b*. The DAVE 304*b* functionality may be embodied as a video card that is configured accordingly. Examples of video cards that may be configured to provide the described functionality include but are not limited to the Diamond Stealth S60, ASUS V9400-X, or RADEON 7000.

Ultimately, the signals are used to provide a display on the external display, as required according to the particular type of display. For example, the video data stream may be a digital RGB signal which represents the intensity of the red, green and blue light respectively at different position. This signal is converted to analog by a D/A converter. This converted analog signal is quantified to the voltage and format required by the standard, such as the input of cathode-ray-tube (CRT) monitor. This standard video signal will drive a set of electron guns, which produce a controlled stream of electrons to display of red, green and blue light respectively on a CRT screen. This is but one example and the present invention is not limited to a particular technology (e.g., CRT) for the external display.

As described, in one embodiment the MTSCM may be independently housed separately from both the mobile terminal and external display terminal, with respective connections to the other devices to provide a system configuration that includes the three pieces of hardware (mobile terminal, conversion box, external display terminal). This configuration provides the flexibility of allowing any standard mobile terminal and/or display to be potentially interface with the MTSCM without imposing constraints on the mobile terminal or external display terminal manufacturers. A possible drawback to this configuration is that additional hardware is introduced into the system.

Figure 5:
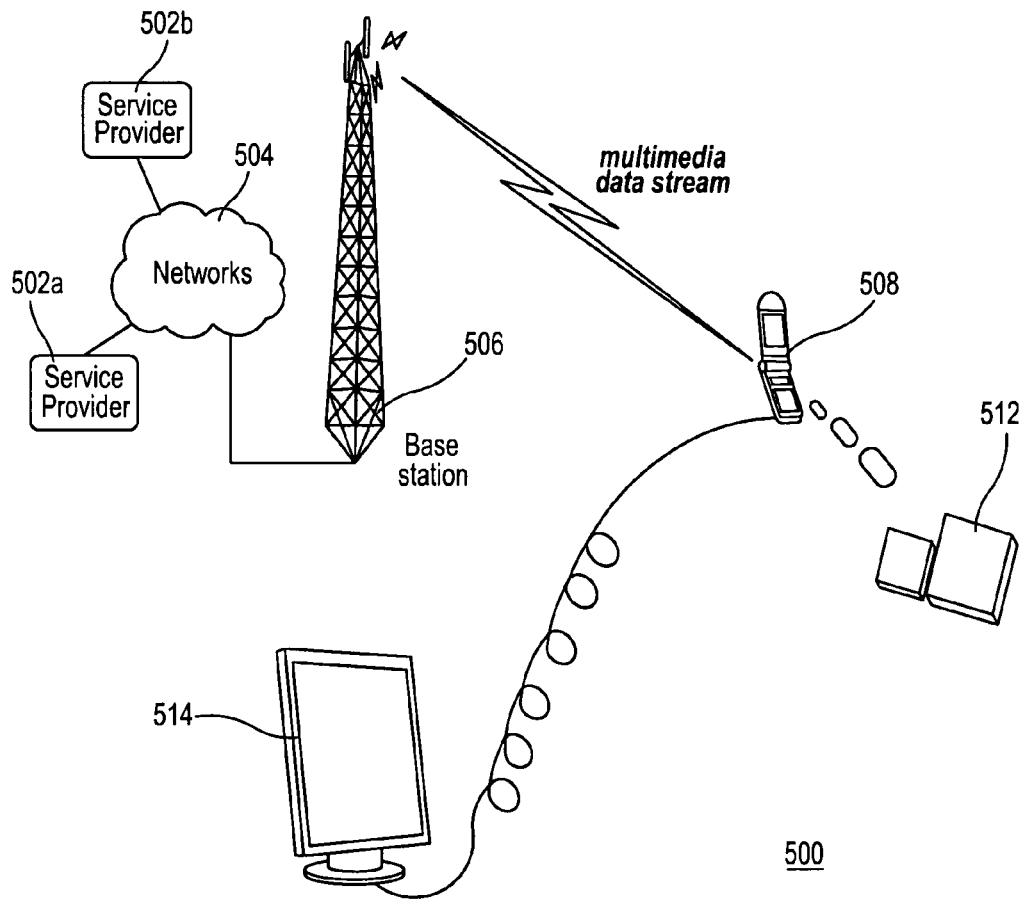
FIG. 5 is a schematic diagram illustrating another example of a system in which mobile terminal signal conversion may reside in accordance with the present invention.

In lieu of the three component system, the MTSCM may be located in either the mobile terminal or the external display. FIG. 5 is a schematic diagram illustrates an example of a system 500 in which the MTSCM mobile terminal signal conversion may reside within the mobile terminal 508. The components and functionality of the service providers 502a,b network 504 and base station 506 for delivering multimedia signals to the mobile terminal 508 is the same as for the analogous elements of FIG. 1 and need not be re-described. Similarly, the external display terminal 514 may be any of the various types named above.

The MTSCM 512 provides the same functionality described above. However, in contrast to residence in a separate housing, the MTSCM 512 is a component of the mobile terminal 508. A potential advantage of this system 500 is that, again, any standard equipment can serve as an external display terminal 514, without a constraint on the display manufacturer. Additionally, only a simple wired or wireless interface is required to connect the external display with the mobile terminal 508. This means, for example, that the user will not be required to carry a bulky conversion module in addition to their cellular phone.

A potential drawback to this system 500 is that the execution platform of the mobile terminal 508 may be designed to accommodate only traditional functionality, so for some systems it may be challenging to add the MTSCM functionality to the existing platform. Additionally, the MTSCM will consume power that may unduly exhaust the limited power supply offered by the mobile terminal 508 battery. It is useful for this embodiment to provide power to the mobile terminal 508 through the cable connection to the external display terminal 514, but again this may require modification to the mobile terminal 508 as the existing charger interface may be insufficient.

Figure 6:
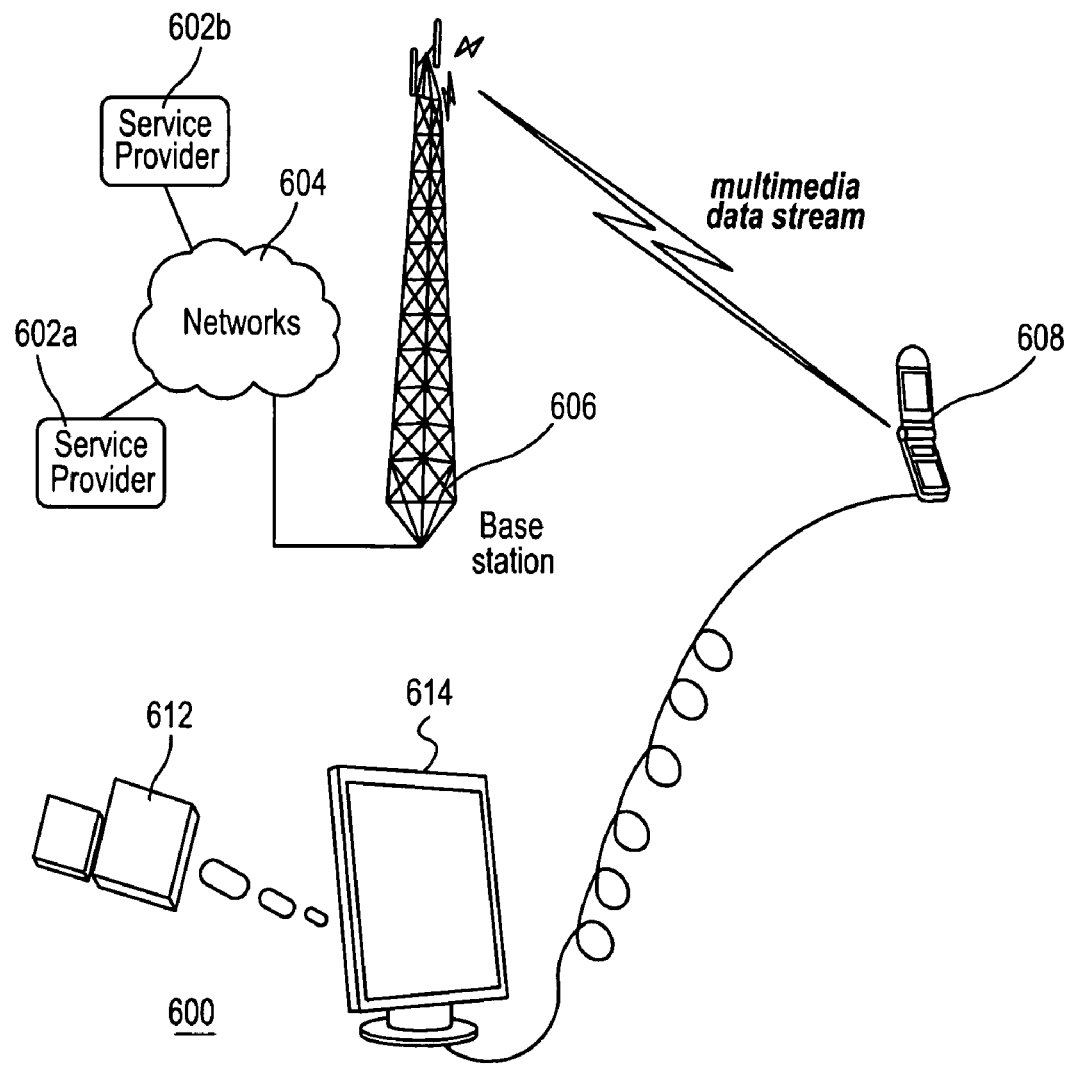
FIG. 6 is a schematic diagram illustrating still another example of a system in which mobile terminal signal conversion may reside in accordance with the present invention.

FIG. 6 is a schematic diagram illustrating another example of a system 600, in which the MTSCM 612 resides within the external display terminal 614. As with FIG. 5, the components and functionality of the service providers 602a,b network 604 and base station 606 for delivering multimedia signals to the mobile terminal 608 is the same as for the analogous elements of FIG. 1 and need not be re-described.

Here, the mobile terminal 608 need only be connected directly to the external display terminal 614. However, in lieu of having the MTSCM 612 functionality reside within the mobile terminal 608, it is part of the external display terminal 614. The power supply and execution platform issues associated with placing the MTSCM 614 in the mobile terminal are resolved with this system 600, and any mobile terminal 608 can potentially be connected to any MTSCM-ready external display without requiring modification, other than provision of an output interface. A potential drawback of this configuration is that it adds a component to the standard external display terminal, and corresponding costs.

Figure 7:
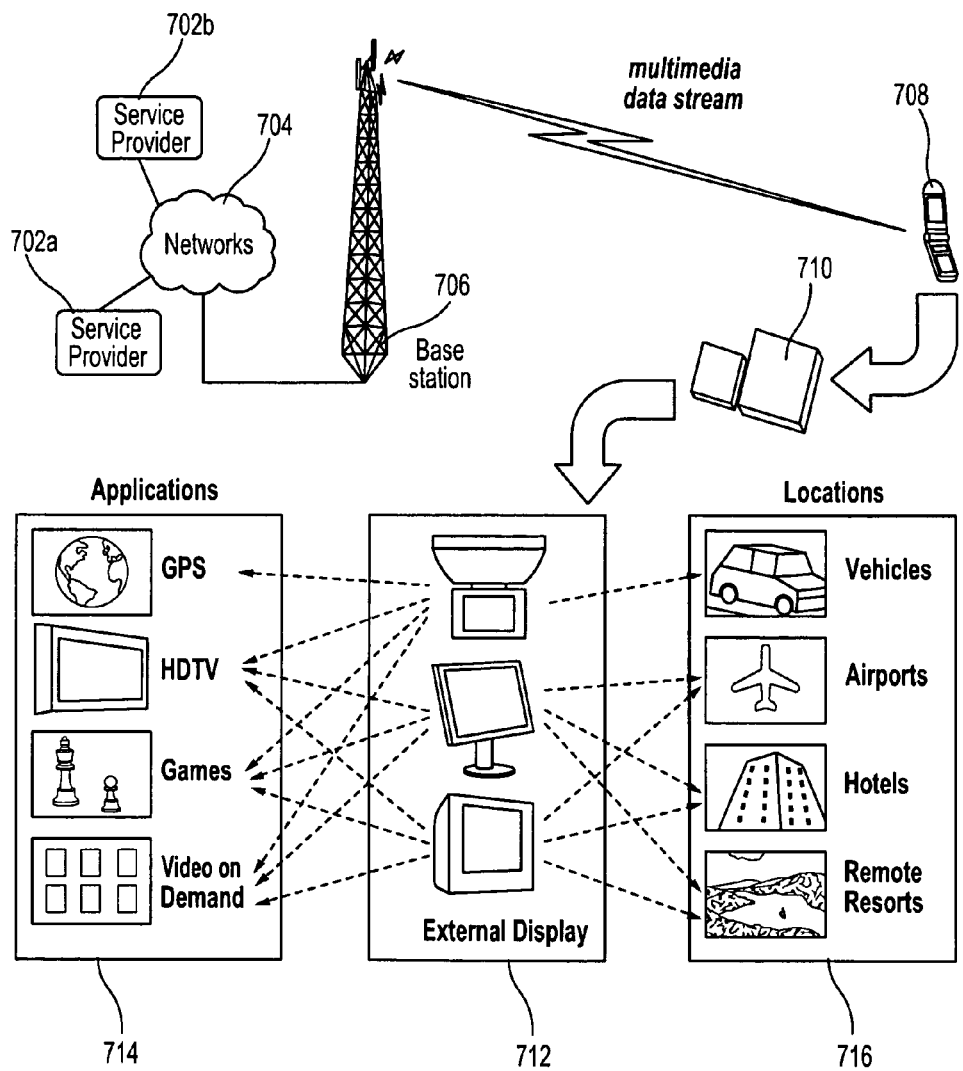
FIG. 7 is a schematic diagram illustrating examples of mobile terminal signal conversion applications in accordance with the present invention.

FIG. 7 is a schematic diagram illustrating examples of mobile terminal signal conversion applications 700 in accordance with the present invention. These applications 700 are provided by way of example, to give the reader an understanding of the potential contexts in which embodiments of the present invention may operate. The present invention is not limited to the disclosed applications, nor are all potential applications required for any given embodiment.

The basic architecture for provision of the wireless communications signal and corresponding multimedia signal is as described above for the service providers 702a-b, network 704, base station 706 and mobile terminal 708. The MTSCM 710 may be separate or reside in the mobile terminal 708 or display terminal 712. Examples of applications 714 where a larger screen and potentially superior audio may be enjoyed include video conference, HDTV, games, GPS, and video on demand. Additionally, embodiments of the present invention will accommodate enjoyment of full multimedia capability in locations 716 including vehicles, airports, hotels and remote resorts. Thus, for example, the present invention accommodates usage inside a vehicle, a plane or any type of transportation, enabling the passenger to browse the Internet, watch TV, play games, participate in a video conference or call, and work on all sorts of software with full functionality.

Thus embodiments of the present invention produce and provide mobile terminal signal conversion. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for processing signals to accommodate reproduction by an alternative display terminal, the method comprising: receiving, by a conversion device, a video signal appropriate for displaying a video content on a mobile terminal, the video signal being received by the conversion device from a cellular network communication that is sent to the mobile terminal and then received by the conversion device; processing, by the conversion device, the video signal to produce a converted video signal for use by the alternative display terminal, wherein processing by the conversion device includes converting the video signal from a compression format appropriate for the mobile terminal to a display format for the alternative display terminal that is different from the compression format, such that the converted video signal produced by the conversion device comprises the display format for the alternative display terminal; and providing the converted video signal from the conversion device to the alternative display terminal to accommodate displaying the video content by the alternative display terminal.

2. The method of claim 1, wherein the mobile terminal is a cellular phone.

3. The method of claim 1, wherein the mobile terminal is a personal digital assistant.

4. The method of claim 1, wherein receiving the video signal, processing the video signal to produce the converted video signal, and providing the converted video signal to the alternative display terminal is performed using power from a source that differs from an internal power supply of the mobile terminal.

5. The method of claim 1, wherein the conversion device resides in the alternative display terminal.

6. The method of claim 1, wherein the video signal received is part of a multimedia signal that is received in the cellular network communication.

7. The method of claim 1, wherein the alternative display terminal is an external display terminal.

8. A system for processing signals to accommodate reproduction by an alternative display terminal, the system comprising:

means for receiving a video signal appropriate for displaying a video content on a mobile terminal, the video signal being received from a cellular network communication that is sent to the mobile terminal and then received by the means for receiving the video signal;

means for processing the video signal to produce a converted video signal for use by the alternative display terminal, wherein processing by the means for processing the video signal includes converting the video signal from a compression format appropriate for the mobile terminal to a display format for the alternative display terminal that is different from the compression format, such that the converted video signal produced by the means for processing the video signal comprises the display format for the alternative display terminal; and means for providing the converted video signal to the alternative display terminal to accommodate displaying the video content by the alternative display terminal.

9. The system of claim 8, wherein the mobile terminal is a cellular phone.

10. The system of claim 8, wherein the mobile terminal is a personal digital assistant.

11. The system of claim 8, wherein receiving the video signal, processing the video signal to produce the converted video signal, and providing the converted video signal to the alternative display terminal is performed using power form a source that differs from an internal power supply of the mobile terminal.

12. The system of claim 8, wherein the means for receiving the video signal, means for processing the video signal to produce the converted video signal, and means for providing the converted video signal to the display terminal reside in a conversion module within the alternative display terminal.

13. The system of claim 8, wherein the video signal received is part of a multimedia signal that is received in the cellular network communication.

14. The system of claim 8, wherein the alternative display terminal is an external display terminal.

15. An apparatus for processing signals to accommodate reproduction by an alternative display terminal, the apparatus comprising: an interface, which receives a video signal appropriate for displaying a video content on a mobile terminal, the video signal being received from a cellular network communication that is sent to the mobile terminal and then received by the interface; a signal conversion hardware component, in operative communication with the interface, which processes the video signal to produce a converted signal for use by the alternative display terminal, wherein processing by the signal conversion hardware component includes converting the video signal from a compression format appropriate for the mobile terminal to a display format for the alternative display terminal that is different from the compression format, such that the converted video signal comprises the display format for the alternative display terminal; and a device interface, in operative communication with the signal conversion hardware component, which provides the converted video signal to the alternative display terminal to accommodate displaying the video content by the alternative display terminal.

16. The apparatus of claim 15, wherein the mobile terminal is a cellular phone.

17. The apparatus of claim 15, wherein the mobile terminal is a personal digital assistant.

18. The apparatus of claim 15, wherein power to receive the video signal, process the video signal to produce the converted video signal, and provide the converted video signal to the alternative display terminal is from a source that differs from an internal power supply of the mobile terminal.

19. The apparatus of claim 15, wherein the apparatus resides in the alternative display terminal.

20. The apparatus of claim 15, wherein the video signal received is part of a multimedia signal that is received in the cellular network communication.

21. A computer memory having program code stored thereon for processing signals to accommodate reproduction by an alternative display terminal, the program code executable by a processor to perform operations comprising:

receiving a video signal appropriate for displaying a video content on a mobile terminal, the video signal being received from a cellular network communication that is sent to the mobile terminal;

processing the video signal to produce a converted video signal for use by the alternative display terminal, wherein processing includes converting the video signal from a compression format appropriate for the mobile terminal to a display format for the alternative display terminal that is different from the compression format, such that the converted video signal comprises the display format for the alternative display terminal; and providing the converted video signal to the alternative display terminal to accommodate displaying the video content by the alternative display terminal.

\* \* \* \* \*